United States Patent

[11] 3,626,419

| [72] | Inventor | Charles William Earp<br>London, England |
|---|---|---|
| [21] | Appl. No. | 859,915 |
| [22] | Filed | Sept. 22, 1969 |
| [45] | Patented | Dec. 7, 1971 |
| [73] | Assignee | International Standard Electric<br>Corporation<br>New York, N.Y. |
| [32] | Priority | Sept. 23, 1968 |
| [33] | | Great Britain |
| [31] | | 45,088/68 |

[54] DOPPLER NAVIGATION SYSTEM
6 Claims, 2 Drawing Figs.

[52] U.S. Cl. .................................................. 343/106 D
[51] Int. Cl. .................................................. G01s 1/38
[50] Field of Search ...................................... 343/113
DE, 106 D

[56] References Cited
UNITED STATES PATENTS

| 3,234,554 | 2/1966 | Earp et al. ............... | 343/113 DE X |
| 3,290,685 | 12/1966 | Steiner ..................... | 343/113 DE X |

Primary Examiner—T. H. Tubbesing
Attorneys—C. Cornell Remsen, Jr., Walter J. Baum, Paul W. Hemminger, Percy P. Lantzy, Philip M. Bolton, Isidore Togut and Charles L. Johnson, Jr.

ABSTRACT: A first frequency signal is successively radiated from each antenna of a vertical array thereby simulating a constant velocity moving source; and second and third frequency signals are continuously transmitted from another antenna. A receiver responsive to all of the radiated signals derives therefrom the doppler shift of the first frequency signals which propagate to said receiver via a direct transmission path while distinguishing from those propagated via an indirect path. Said doppler shift is proportional to the angle of elevation from said receiver to said array.

PATENTED DEC 7 1971  3,626,419

Inventor
CHARLES W. EARP
By Carlos Nieves
Attorney

DOPPLER NAVIGATION SYSTEM

BACKGROUND OF THE INVENTION

1. Field of the Invention

The subject invention relates generally to doppler navigation systems and more particularly to one which enables the angle of elevation between a beacon and a receiver to be determined.

2. Summary of the Invention

It is an object of the invention to provide an improved navigation system.

It is another object of the invention to provide an improved beacon from which a mobile craft can determine its angle of elevation.

According to the invention there is provided a navigation system comprising a beacon for simulating a moving source of electromagnetic energy which radiates a first frequency signal, said movement producing at receiving positions radiated signals having different doppler shifts corresponding to direct and indirect propagation paths; and a receiver responsive to the radiated signal transmitted over at least one of said paths for deriving therefrom navigation information.

BRIEF DESCRIPTION OF THE DRAWINGS

The above-mentioned and other objects of this invention will become apparent by reference to the following description in conjunction with the accompanying drawings, in which:

Referring to FIG. 1 there is shown an aerial array 1 which includes a number of equally spaced radiating elements, some of which are shown at 2, 3, 4 and 5, which are vertically stacked above the ground, indicated by a horizontal line 6. An aircraft is represented by point 7, and the angle between a line 8 shown between the aircraft 7 and the ground plane 6 at the base of the array 1 is represented by $\alpha$. The angle $\alpha$ is the angle of elevation of the aircraft.

Figure 1:
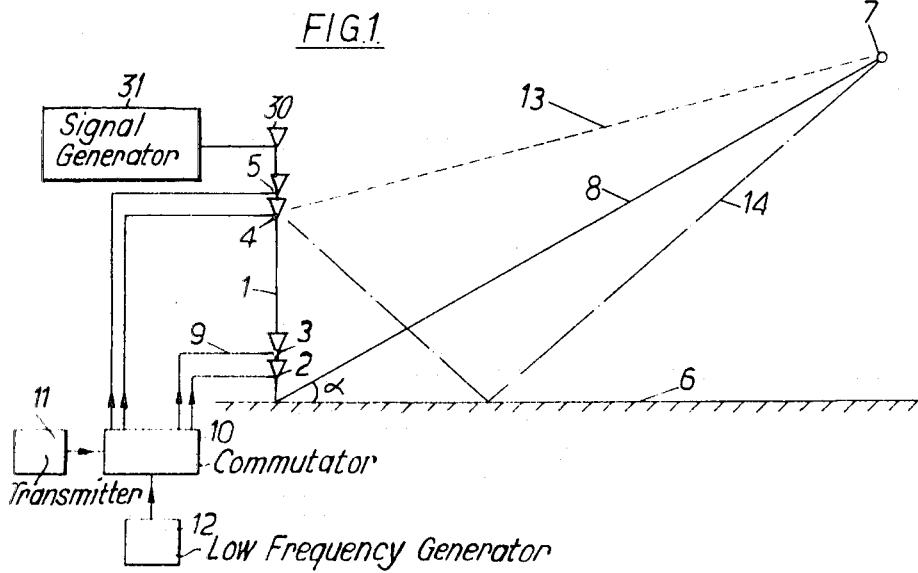
FIG. 1 is a schematic diagram of the ground beacon.

The distance between the aircraft 7 and the array 1 is usually many times greater than the height of the array 1 above the ground, and the aircraft is located in the far field of the aerial.

Each of the elements of the array is connected by a feeder, such as 9, to a commutator arrangement 10. The commutator 10 is connected to a radio transmitter 11 and to a low-frequency generator 12.

Radio signals of a frequency $(F-f)$, where $f$ is very small compared with $F$, from the transmitter 11 are fed successively and cyclically by the commutator 10 to each of the elements of the array over the corresponding feeder, to simulate vertical movement, upwards only, of the radiating source of continuous wave at a frequency $(F-f)$.

The commutation process is controlled by a signal from the low-frequency generator 12, the commutation or scanning frequency being typically 30 Hz.

Also located at the ground beacon, is a single aerial 30, positioned at a height above the ground plane 6, and if necessary being provided with counterpoises, such that its signals are radiated over the whole service volume of the beacon. The aerial transmits a signal of a continuous wave at a frequency of $F$, and another signal of frequency $(F-f)$.

The direct path signal, represented by the dashed line 13, from the aerial array 1 to the aircraft 7, with upward scanning of the array, has imposed thereon a positive Doppler frequency shift, while the ground-reflected signal, represented by the chain-dotted line 14, has imposed thereon a negative Doppler frequency shift.

Figure 2:
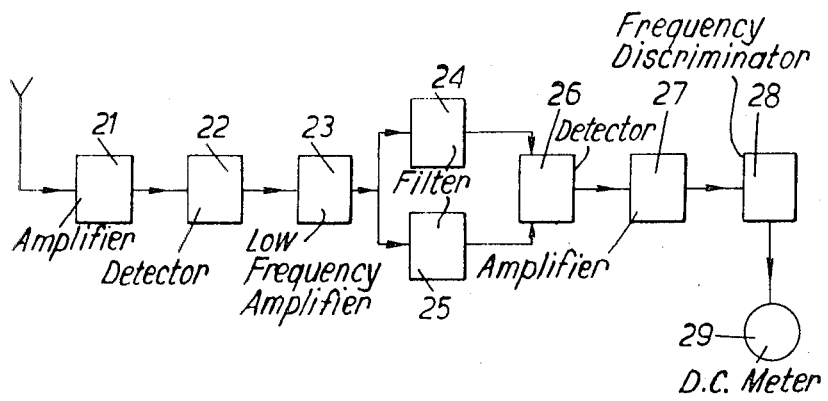
FIG. 2 is a block schematic diagram of a beacon receiver for use in an aircraft.

At the mobile receiver, shown in FIG. 2, the whole signal is comprised of frequencies $F$, $(F-f)$, $(F-f)+\Delta f$ and $(F-f)-\Delta f$, where $\Delta f$ is the Doppler frequency shift, positive for the direct path signal and negative for the reflected signal.

At the receiver, the whole signal is passed through a signal amplifier and selector 21 and thence through a detector 22 from which emerge the beat frequency $f$, another component $(f-\Delta f)$ due to the direct path of the commutated signal, and a further component $(f+\Delta f)$ due to the reflected signal.

After further amplification by a L.F. amplifier 23, the three beat frequencies are passed in parallel to a low-pass filter 24 which stops all values of $(f+\Delta f)$ and passes all values of $(f-\Delta f)$ corresponding to the range of glide-slopes required, and to a filter 25 which passes only frequency $f$.

The respective outputs from filters 24 and 25 are fed to a detector 26 from the output of which emerges frequency $\Delta f$, which is proportional in frequency to the sine of the angle of elevation.

The signal from the detector is amplified by L.F. amplifier 27 and then fed to a frequency discriminator 28 which is adjustably centered on frequency $\Delta f$ which corresponds to the required glide-angle.

Direct current output from the discriminator 28 is a linear representation of elevation angle departure, positive or negative, from the chosen glide angle, and the output from the discriminator feeds a center reading glide meter 29 (DC meter).

If the vertical dimension of the ground beacon aerial array is 20 wavelengths, then the Doppler frequency shift $\Delta f$ at 3° angle of elevation is equal to the commutation frequency of 30 Hz., as the radio direct path is shortened by one wavelength for each upward sweep of radiation.

In practice, the height of the aerial array might be as much as 60 wavelengths, giving good elevation information down to 1°, and permitting ease of filtering of the wanted direct waves from the reflected signal.

Thus with an operating frequency of 4 GHz., the base line of 60λ would be about 15 feet. The lowest radiating element could be 5 feet above ground in order to be free from the effects of snowfall, so the total structure height would be about 20 feet. At an operating frequency of 1.5 GHz. the same degree of performance at very low angles of elevation would involve a total height of about 50 feet, but a height of 30 feet would still permit a satisfactory performance.

The number of separate radiating elements in the vertical stack of the array depends upon the highest glide-angle required. For a maximum elevation of 30°, if it is assumed that the maximum receiver phase steps should not exceed 120°, then this involves unit spacing of 2λ/3, so that a 30λ array would require about 45 radiators. If limited to glide angles up to 10°, the array might be comprised of 15 elements only.

The frequency spacing of $f$ of the two frequency sources of the beacon also depend on the range of glide-slope required, and typically may be of the order of 50 times the aerial scanning frequency. Thus for a scanning frequency of 30 Hz., $f$ would be 1,500 Hz. For an aerial aperture of 60λ, $\Delta f$ would then rise to 900 Hz. at 30°.

It will be apparent that the system is very flexible in design.

Either of the two transmitted frequencies may be used for transmission from the scanned array, and either upward or downward scanning may be used.

According to which frequency is transmitted and which direction of scanning is used, these factors determine whether it will be necessary at the receiver, to select $(f+\Delta f)$ or $(f-\Delta f)$, i.e. to utilize the Doppler frequency shift of the direct path signal.

The scanning could be by linear symmetrical sawtooth waveform, but this would involve synchronous switching of filtering in the receiver.

The noncommutated signal is preferably of dominant field strength.

I claim:

1. A navigation system comprising:
    a beacon for simulating unidirectional motion of a radiating source which radiates a first frequency signal, said unidirectional motion producing at receiving positions radiated signals having different doppler shifts corresponding to direct and indirect propagation paths; and a receiver responsive to the direct path radiated signal for deriving navigation information from the doppler frequency shift of said direct path signal.

2. A navigation system, according to claim 1, wherein said beacon comprises:
a vertical array of spaced aerials;
a source providing said first frequency signal; and
means for cyclically coupling said source to the aerials of said array.

3. A navigation system, according to claim 2, wherein said means for cyclically coupling said source to aerials of said array includes:
a commutator coupled to said source; and
means for controlling the commutator rate.

4. A navigation system, according to claim 1, further including:
means for transmitting from a stationary source a second signal at the same frequency as that of said first frequency signal; and
means for transmitting a third frequency signal at a frequency which differs from the frequency of said second signal.

5. A navigation system, according to claim 4, wherein said receiver includes:
means for deriving from said second frequency signal, said third frequency signal, and said first frequency signal, the doppler shift of said first frequency signal which propagates over a direct propagation path.

6. A navigation system, according to claim 5 wherein said means for deriving the doppler shift of said first frequency signal includes a frequency discriminator, and a DC meter coupled thereto for measuring glide angles.

* * * * *